United States Patent
Huber et al.

(10) Patent No.: US 7,134,446 B2
(45) Date of Patent: Nov. 14, 2006

(54) STOP VALVE FOR A PORTABLE PRESSURIZED-GAS CONTAINER, IN PARTICULAR FOR A COMPRESSED-AIR BOTTLE FOR DIVING APPLICATIONS

(75) Inventors: Robert L. Huber, München (DE); Robert Stoss, Schwarzenbrück (DE)

(73) Assignee: Seemann Sub GmbH & Co. KG (DE)

( * ) Notice: Subject to any disclaimer, the term of this patent is extended or adjusted under 35 U.S.C. 154(b) by 118 days.

(21) Appl. No.: 10/931,359

(22) Filed: Sep. 1, 2004

(65) Prior Publication Data
US 2005/0051212 A1    Mar. 10, 2005

(30) Foreign Application Priority Data
Sep. 10, 2003   (DE) ............................... 103 42 103

(51) Int. Cl.
*F17D 1/00* (2006.01)
(52) U.S. Cl. ........................ 137/269; 137/270
(58) Field of Classification Search ........... 137/269, 137/270
See application file for complete search history.

(56) References Cited

U.S. PATENT DOCUMENTS

| 3,742,972 A | 7/1973 | Hughes |
| 4,903,722 A | 2/1990 | Joseph et al. |
| 4,996,982 A | 3/1991 | Williamson et al. |
| 5,193,580 A | 3/1993 | Wass et al. |
| 6,142,346 A | 11/2000 | Aderholt et al. |
| 6,196,256 B1 * | 3/2001 | Klampfer .................... 137/269 |
| 6,378,911 B1 * | 4/2002 | Grohe ..................... 285/125.1 |

FOREIGN PATENT DOCUMENTS

| DE | 197 02 819 A1 | 7/1998 |
| DE | 199 17 431 A1 | 11/2000 |
| WO | WO 02/078787 A | 10/2002 |

* cited by examiner

*Primary Examiner*—Kevin Lee
(74) *Attorney, Agent, or Firm*—McNair Law Firm, P.A.

(57) ABSTRACT

The invention relates to a stop valve (1, 1', 1") for a portable pressurized-gas container (35). A valve body (2) is provided with three connection adapters (7, 17, 18), i.e. one central connection adapter as a gas tank connection adapter (7), another connection adapter as outlet connection adapter (17) and a third connection adapter as spindle drive receiving adapter (18). Valve body (2) is made in several parts including valve body element (3) with the outlet connection adapter (17) and a spindle drive receiving adapter (18) and a radial valve seat element receiving bore (20) going to the bottom of the spindle drive receiving adapter (18). Furthermore, the valve body (2) has an oblong valve seat element (5) with gas supply bore (29) provided at the one end of the valve seat (30) and a bearing collar (26) on the other end. In its assembled state, the valve seat element (5) is inserted tightly into the radial bolt receiving bore (20). In addition, the valve body (2) has a main bolt (4) which is inserted tightly into the central main bolt receiving bore (19). Suitable gas supply bores (9, 11, 29) allow gas to flow from the connected pressurized-gas container (35) via the spindle drive receiving adapter (13) to the outlet connection adapter (17).

12 Claims, 7 Drawing Sheets

STOP VALVE FOR A PORTABLE PRESSURIZED-GAS CONTAINER, IN PARTICULAR FOR A COMPRESSED-AIR BOTTLE FOR DIVING APPLICATIONS

CROSS REFERENCE TO RELATED APPLICATION

This application claims priority from German Patent Application No. 103 42 103.3 filed Sep. 10, 2003.

FIELD OF THE INVENTION

The invention relates to a stop valve for a portable pressurized-gas container, in particular for a compressed-air bottle for diving applications.

BACKGROUND

A generally known stop valve for a compressed-air bottle for diving applications is, in one design, in the form of a single connection valve consisting of one valve body with three connection adapters. The central connection adapter is a connection adapter for a gas container and, as such, it is provided with threads for the connection of the gas container, being as a rule an outside thread. The two additional connection adapters which are offset in axial direction are made in the form of outlet and connection adapters and as spindle drive receiving adapters and are axially offset, lying in a transversal plane radial to the axis of the gas container connection adapter. A central gas supply bore is provided, starting at the gas container connection adapter and going into the transversal area and then a radial gas supply bore to the bottom area of the spindle drive receiving adapter, where a valve seat with a gas chamber surrounding it is formed in the bottom area. This is the gas supply going from the pressurized-gas container to the valve seat.

A manually operated spindle drive with a seat seal that is adjustable relative to the valve seat is tightly installed in the spindle drive receiving adapter and held in place by screw attachment. In a known design the spindle drive is provided with a screw connection element with a rotatable upper spindle and a lower spindle with seat seal that is coupled to the upper spindle and is adjustable relative to the valve seat. An outlet gas line goes from the valve seat gas chamber to the bottom area of the outlet connection adapter. Such a stop valve is designed especially for a compressed-air bottle for diving applications, whereby demand oxygen system is connected to the outlet connection adapter.

Also generally known is a double connection valve of similar design having two valve units in one valve body that can be closed and opened independently of each other. For this purpose two outlet connection adapters and two spindle drive receiving adapters with associated valve seats and spindle drives are provided which are supplied via a gas container connection adapter. One outlet connection adapter and one associated spindle drive receiving adapter are installed in a known embodiment with 90° offset, so that a cross-shaped adapter arrangement results. It is known in this case to provide the outlet connection adapters across from each other in a so-called parallel valve arrangement or in a corner valve arrangement with 90° offset. When used as a stop valve on compressed-air bottles in diving applications the double connection valve has the function of providing the possibility to use two demand oxygen systems that can be actuated independently of each other are connected, and can in particular be used independently of each other and alternatively in case of trouble, as a safety measure. With stop valves for a portable pressurized-gas container, in particular with compressed-air bottles for diving applications, different containers with different connection threads are brought on the market. In particular different thread sizes as well as metric threads or threads in inches are used. Also, such different connection threads for the connection of demand oxygen systems are commonly sold, whereby double connection valves, corner valves or parallel valves are used depending on the individual case and in order to cover all possible variations of connection valves and geometrical layouts a great number of different designs of stop valves are required. This requires on the one hand high manufacturing expenditures and on the other hand extensive stock management of different designs together with costly logistics. In addition the manufacturing technology for the production and machining of the valve seats in the bottom area of the spindle drive receiving adapters is expensive. In case of problems with tightness due to defects on the valve seat, in particular due to wear, at least the entire valve body of the stop valve must be replaced.

SUMMARY OF THE INVENTION

It is an object of the present invention to provide a simple and economical design of a stop valve that is easily adaptable to different situations, in particular to different connection threads. Furthermore tightness problems at the valve seat should be easily and economically repairable.

This and other objects are attained through the invention which is a stop valve for a portable pressurized-gas container, in particular a compressed-air tank for diving applications comprising a valve body having at least three connection adapters; a central connection adapter being a gas tank connection adapter that is provided with tank connection threads; at least two additional connection adapters which are axially offset serve as outlet connection adapters and spindle drive receiving adapters and which are located in a transversal plane radial to the axis of the gas container connection adapter; at least one central gas line bore starting at the gas container connection adapter leads into the transversal area and is followed by a radial gas supply bore going to the bottom area of the spindle drive receiving adapter, with a valve seat with a valve seat gas chamber surrounding it being formed in the bottom area; a hand-operated spindle drive with seat seal adjustable relative to the valve seat tightly inserted in the spindle drive receiving adapter and held there by screw connection; and, an outlet gas line going from the valve seat gas chamber to the bottom area of the outlet connection adapter, and, the valve body is made in several parts and comprises in a single connection valve of a valve body element with the outlet connection adapter and the spindle drive receiving adapter with a main bolt receiving bore and a radial valve seat element receiving bore in the direction of the bottom of the spindle drive receiving adapter.

In addition the stop valve comprises an oblong valve seat part with a gas supply bore going to the valve seat, on which the valve seat is installed at one end, and a support collar on the other end. The valve seat part is tightly inserted into the radial valve seat receiving bore through the receiving bore of the main bolt and is supported and held via the supporting collar in a direction pointing radially to the outside, preferably flush with the main bolt receiving bore wall.

The multi-element valve body furthermore consists of a main bolt that is inserted tightly into the central receiving bore for the main bolt. The main bolt contains the central gas supply bore and at one end the gas container connection adapter protruding from the valve body is made with the container connection threads followed by a main-bolt collar. The latter serves on the one hand to support the main bolt on the valve body and on the other hand to supply support on the edge of the gas container connection.

At the other end of the main bolt is a toggle screw connection for axial holding of the main bolt in the receiving bore for the main bolt of the valve body. In addition part of the radial gas supply bore in direction of the valve seat bore is provided in the main bolt, whereby the other part of the radial gas supply bore is provided in the valve seat part in direction of the valve seat.

Main bolts can advantageously be made with different gas container connection threads and be kept in stock. Also, valve body parts with different outlet connection threads and as required different spindle drive receiving threads can be produced and stocked. Depending on circumstances and desired individual cases, different combinations of valve body parts and main bolts can easily be combined with each other, so that different stop valve variants can be installed with a reduced number of different parts. This advantageously results in reduced manufacturing costs and reduced storage maintenance costs.

Another advantage is the fact that the valve seat parts can also be installed as individual parts and are attached by the inserted main bolt. Thereby the valve seat element can be exchanged advantageously in case of wear on a valve seat without the expensive necessity of having to replace the entire valve body as was required until now. In case of different requirements concerning sealing and through-flow of gas, a stop valve can in addition be adapted easily to these requirements by means of a differently sized valve seat without having to provide an entirely new valve body version.

In an especially preferred further development, the stop valve is made in form of a double connection valve with two outlet connection adapters and two spindle drive receiving adapters assigned to each, each with a valve seat element and one single central main bolt. By combining and installing valve body elements, central main bolts and valve seat elements of different designs and little diversity of parts, a great number of stop valve variants can obviously be produced here too in accordance with customer requirements and wishes.

In an embodiment of advantageously produced design of a double connection valve, at least one radial gas supply bore in a surrounding gas supply groove, starting at the central gas supply bore, passes through the main bolt, so that an annular gas chamber to which the gas supply bores of the two valve seat elements that are offset relative to each other are connected is formed when the main bolt is installed.

In another embodiment, a cross-shaped adapter arrangement is preferably also provided for the double connection valve, whereby the outlet connection adapters and the associated spindle receiving adapters are offset by 90°. This cross-shaped adapter arrangement is preferably used with a corner valve arrangement in which the two outlet connection adapters are offset by 90° as well as with a parallel valve arrangement where the two outlet adapters are axially across from each other.

An especially advantageous assembly of stop valve variants is afforded by the three valve seat element receiving bores be installed in the valve body element between the main bolt receiving bore and at least three connection adapter bottoms. A valve seat element can be inserted tightly into each of these valve seat element receiving bores to constitute an outlet connection adapter of a blind plug and to constitute an associated spindle drive receiving adapter. If only three valve seat element receiving bores are provided, the outlet connection adapter is always an outlet connection adapter to which a spindle drive receiving adapter with a valve seat element is always assigned. The two other connection adapters can then be made either as outlet connection adapter or spindle drive receiving adapter, depending on where the blind plug and the valve seat element are installed. In this manner it is possible to produce through simple measures either a parallel valve arrangement or a corner valve arrangement. If one valve seat receiving bore is installed for each of the four connection adapter bottoms, a second blind plug that can be suitably assigned to and combined with a valve seat element is required. Thanks to the differing placement of the two blind plugs and of the two valve seat elements, a parallel valve arrangement or a corner valve arrangement can be produced alternatively.

In a further embodiment, internal threads that are as identical as possible are advantageously provided on the outlet connection adapters and spindle drive receiving adapters and external threads are preferably provided on the gas tank connection adapter.

In another development, a pin is inserted between the valve body part and the main bolt collar as a torsion preventer, so that high screwing-in torque can be applied through the connection adapters in order to screw the stop valve into the pressurized-gas container.

Furthermore, in another aspect, torsion prevention is provided for the valve seat element and if necessary of a blind plug via a support collar and a groove in the wall of the main bolt receiving bore. This is essential for torsion-free holding of the valve seat element.

In yet a further aspect of the invention, the gripping screw attachment of the main bolt is constituted advantageously by a holding disk covering the main bolt receiving bore and a central screw connecting the holding disk to the face of the main bolt. This is a simple design solution. However other, generally known holding systems can be used for bolts in receiving bores.

As an additional feature, every outlet gas line going from a valve seat gas chamber to the bottom area of an associated outlet connection adapter is in the form of a straight, direct outlet gas line in the valve body element. This is an embodiment that can easily be produced.

In one alternative embodiment that is usable in particular for a straight direct outlet gas bore where space is a problem, the outlet gas line extends from the valve seat gas chamber in a surrounding gas outlet groove of the assembled main bolt. From there the gas line extends offset along the circumference of the gas outlet guiding groove to the bottom of the associated outlet adapter. In case of a double connection valve, two gas outlet guiding grooves suitably offset axially relative to each other are provided.

In a further feature, the spindle drive consists of a screw-in part that can be screwed into the spindle drive receiving adapter with a rotatable upper spindle extending out of the screw-in part and with an adjustable lower spindle with seating seal that is coupled to it and adjustable relative to the valve seat. This is a functionally reliable, easily produced and easily installed embodiment of a spindle drive.

DESCRIPTION OF THE DRAWINGS

Examples of embodiments of the invention are explained in further detail through the drawings which are illustrative of the invention and are not limiting.

DETAILED DESCRIPTION

Figure 1:
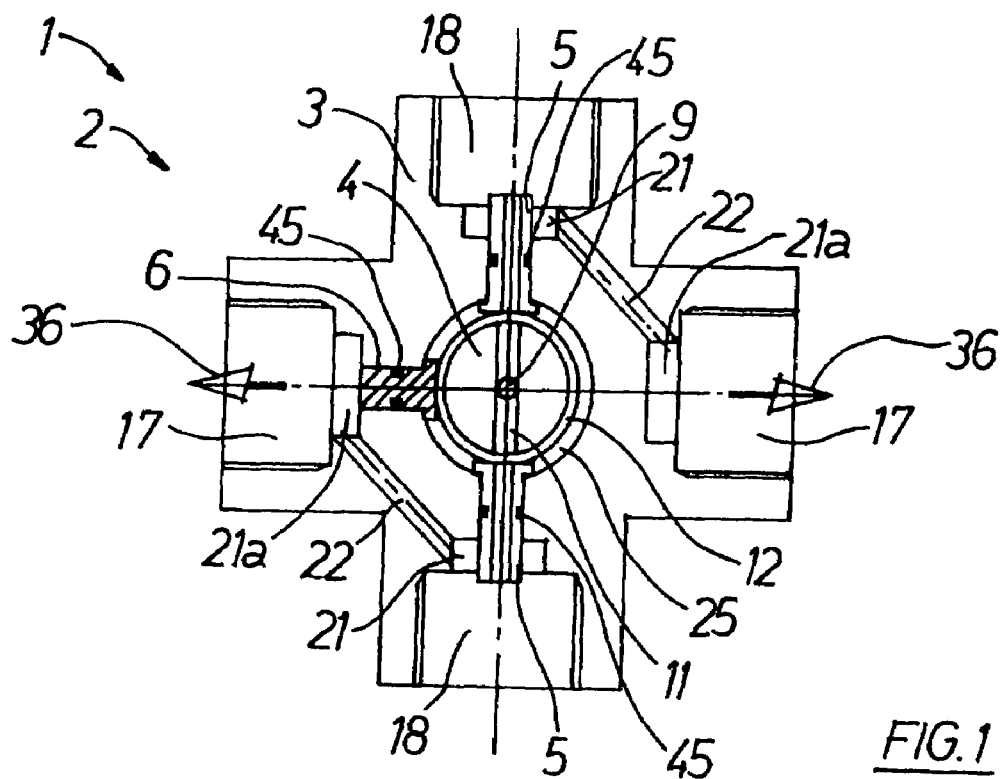
FIG. 1 shows a schematic section through a stop valve in a first embodiment with a parallel valve arrangement.

The invention will now be described in detail. Looking first at FIG. 1, a schematic sectional view through a stop valve 1 in a first embodiment is shown. The stop valve 1 has a valve body 2 made in several parts. The valve body 2 consists of a valve body element 3, a main bolt 4, two oblong valve seat elements 5 and a blind plug 6. These components of the valve body 2 are shown as individual parts in FIGS. 5 to 12, and these are described below in order to promote better overall understanding.

Figure 5:
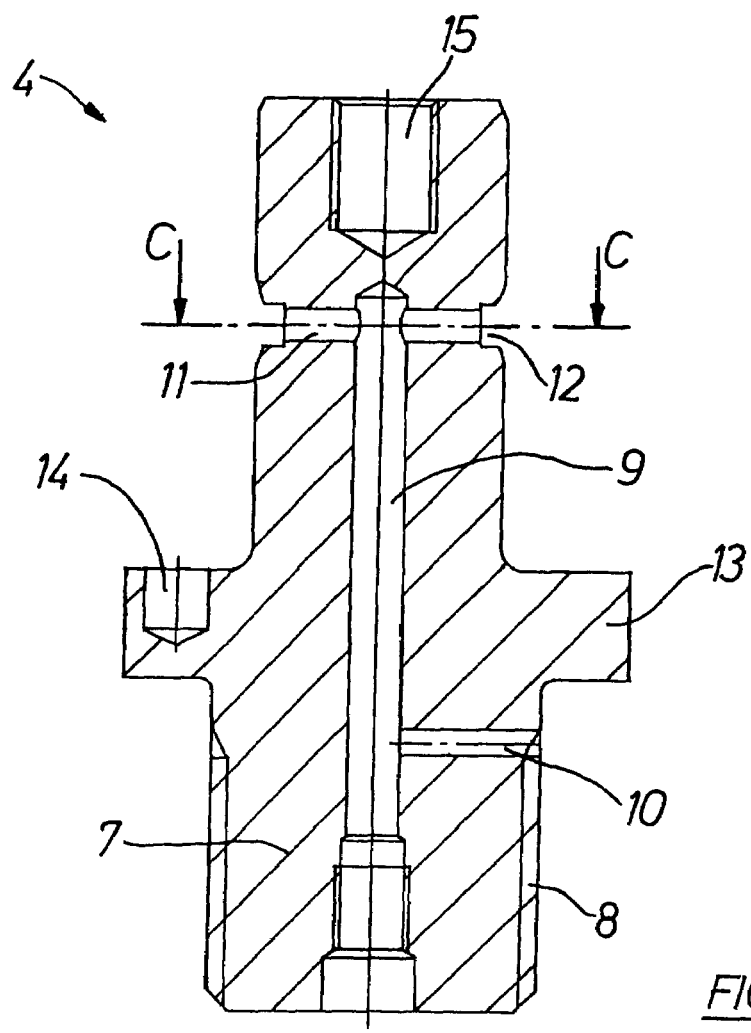
FIG. 5 shows a schematic sectional view of a longitudinal section through a main bolt.

FIG. 5 shows a schematic longitudinal section through the main bolt 4, that is provided with tank connection threads 8. An axially oriented central gas supply bore 9 is formed in the main bolt 4. The tank connection threads 8 are in the form of outside threads, whereby a radially oriented safety bore 10 forming a connection between the central gas supply bore 9 and the outside of the main bore 4 is provided at the end of the tank connection threads 8. The central gas supply bore 9 ends in a transversal area in which the valve body element 3 is located when assembled. In this transversal plane a radial gas supply bore 11 goes through the main bolt 4 and leads into a gas supply groove 12 surrounding the main bolt 4. As seen in the axial direction, between the radial gas supply bore 11 and the gas tank connection adapter 7 a main bolt collar 13 is formed in which a pin bore 14 is located. At the end of the main bolt 4 across from the gas tank connection adapter 7 a blind hole 15 with internal threads is provided into which a screw 16 can be screwed so as to constitute a gripping screw connection to hold the main bolt 4 axially on the valve body element 3.

Figure 6:
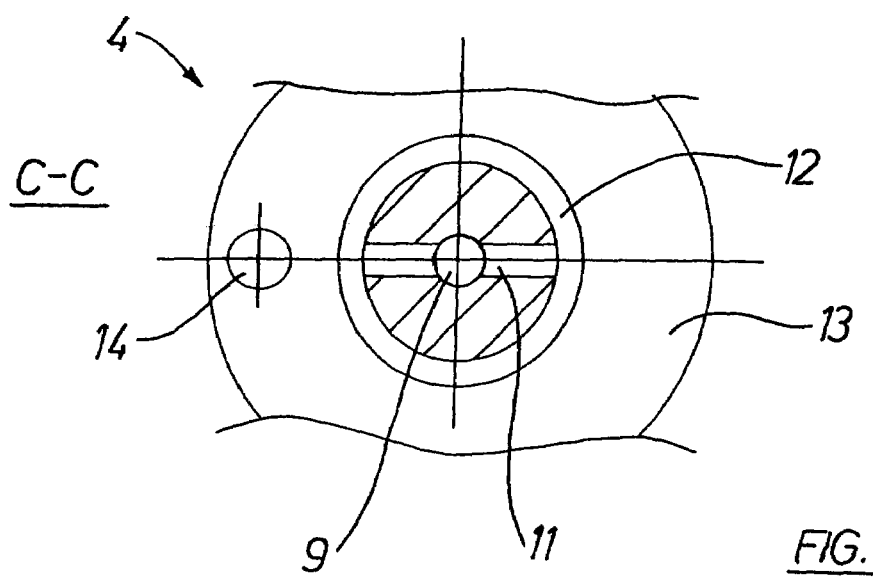
FIG. 6 shows a schematic sectional view along the sectional plane C—C of FIG. 5 of the main bolt.

FIG. 6 shows a schematic sectional view along the sectional plane C—C of FIG. 5. In this drawing the central gas supply bore 9 extends at a right angle to the drawing plane. It can also be seen that the radial gas supply bore 11 in the groove 12 surrounding the main bolt 4 and thus establishes a flow connection between the central gas supply bore 9 and the gas supply groove 12.

Figure 7:
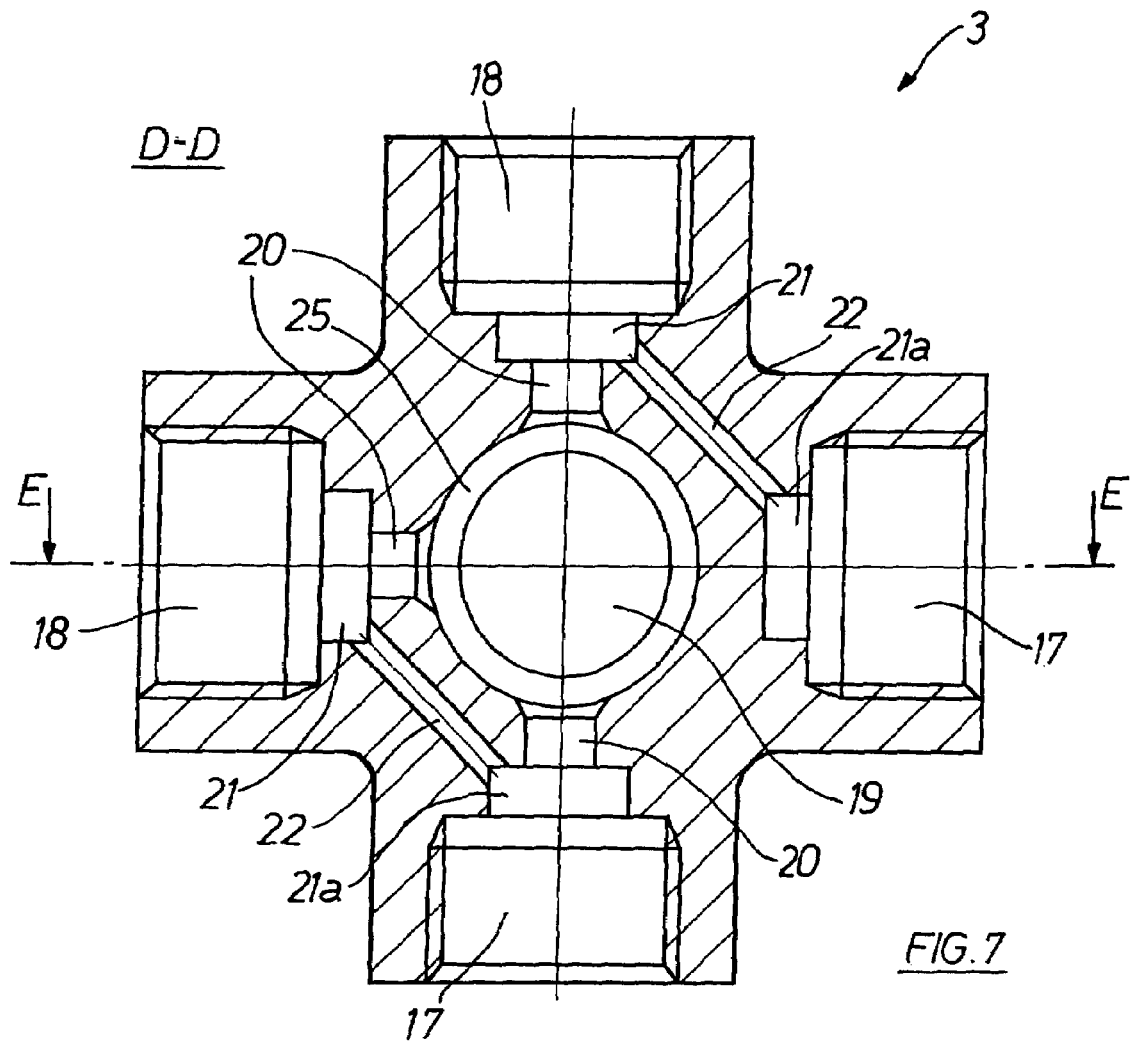
FIG. 7 shows a schematic sectional view through the sectional plane D—D of FIG. 8 of a valve body element.
Figure 8:
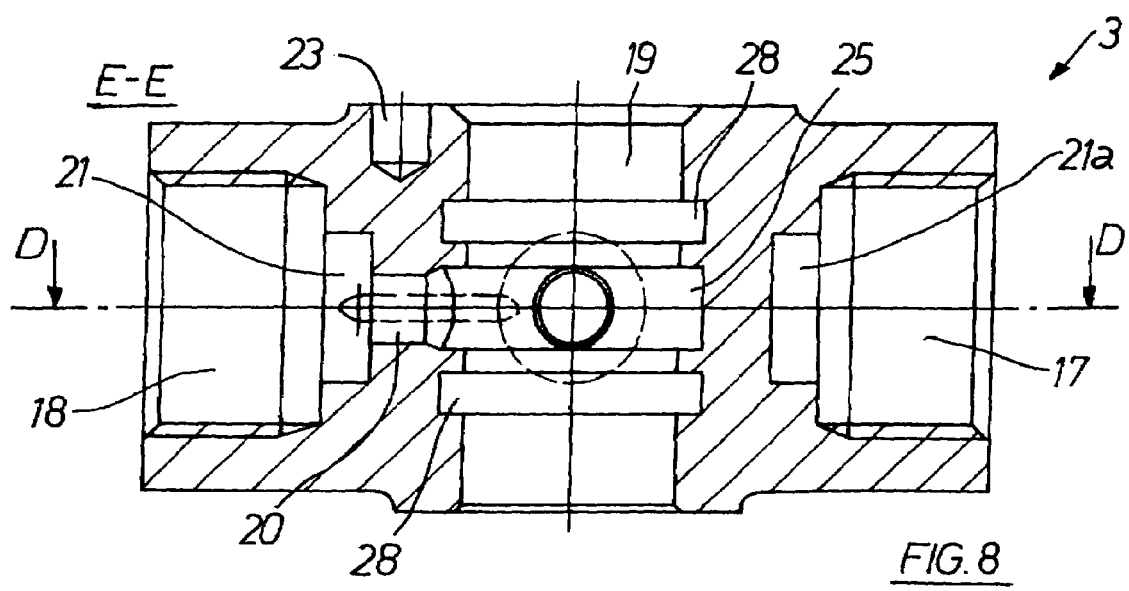
FIG. 8 shows a schematic sectional view along the sectional plane E—E of FIG. 7 of the valve body element.

FIG. 7 shows a schematic sectional view along the sectional plane D—D of FIG. 8 of the valve body element 3. Four connection adapters are arranged in a cross on the valve body element 3. The connection adapters may be outlet connection adapters 17 or spindle drive receiving adapters 18, depending on the design of the stop valve 1. The outlet connection adapters 17 or spindle drive receiving adapters 18 are offset by 90° in cross-shaped adapter arrangements. A main bolt receiving bore 19 is provided in the center of the valve body element 3. From it, three valve seat element receiving bores 20 are provided for three connection adapters and extend radially relative to the connection adapters. Coming from the main bolt receiving bore 19 and depending on the desired embodiment of the stop valve 1, either a valve seat element 5 to form a spindle drive receiving adapters 18 or a blind plug 6 to form an outlet connection adapters 17 can be tightly pushed into the valve seat element receiving bore 20. In the embodiment of the valve body element 3 shown in FIG. 7 a connection adapter without valve seat element receiving bore 20 is provided, so that it is always used as an outlet connection adapter 17. With the spindle drive receiving adapters 18 the bottom area is made in form of a valve seat gas chamber 21 that is connected via an outlet gas line 22 to the bottom area 21a of the associated outlet connection adapter 17. The receiving adapter assigned to the outlet connection adapter 17 without valve seat element receiving bore 20 is accordingly always used as a spindle drive receiving adapter 18, whereby the other two receiving adapters can be used either as spindle drive receiving adapters 18 or as outlet connection adapters 17, depending on the desired embodiment of the stop valve.

FIG. 8 shows a schematic sectional view of the valve body element 3 along the sectional plane E—E of FIG. 7. A pin bore 23 is provided on an outside of the valve body element 3 that is assigned in to the main bolt 4 in the assembled state, so that when the main bolt 4 is installed on the valve body element 3, the pin bore 23 and the pin bore 14 on the main bolt collar 13 are aligned with each other. In this manner a pin 24 can be inserted into the pin bore 14 on the main bolt collar 13 to prevent torsion between the main bolt 4 and the valve body element 3. A surrounding groove 25 is formed in the wall of the main bolt receiving bore 13 in the transversal plane of the valve seat element receiving bores 20, and in this groove 25 a bearing collar 26 of the valve seat element 5 or a bearing collar 27 of the blind plug 6, made out of round for that purpose, is received as torsion preventer for the valve seats 15 or the blind plug 6 when in the assembled state. As seen in axial direction, above and below the groove 25, additional surrounding grooves 28 are provided in the main bolt receiving bore 19 to receive sealing elements.

Figure 9:
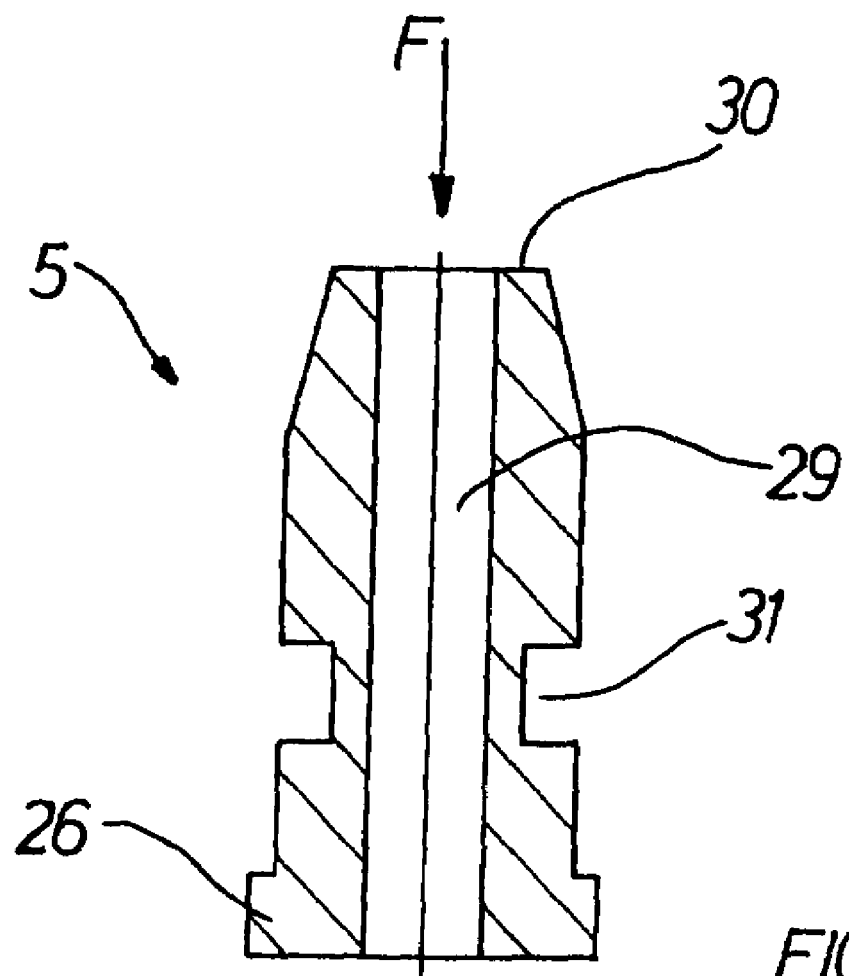
FIG. 9 shows a schematic sectional view of a longitudinal section through a valve seat element.

FIG. 9 shows a schematic longitudinal section through the valve seat elements 5. The oblong valve seat element 5 is provided with a gas supply bore 29. At one end a valve seat 30 is attached, and at the other end the bearing collar 26. Between them is a surrounding groove 31 to receive a sealing element.

Figure 10:
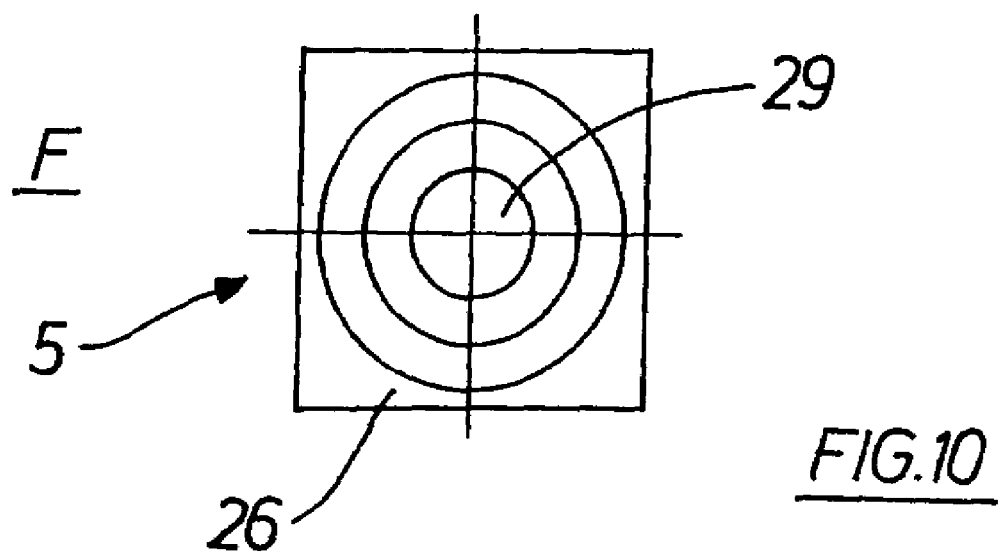
FIG. 10 shows a schematic top view in direction F of FIG. 9 of the valve seat element.

FIG. 10 is a schematic top view of the valve seat element 5 as seen in direction F of FIG. 9. Here the square design of the bearing collar 26 can be recognized, so that the valve seat elements 5, when assembled, is installed with the bearing collar 26 that is received in the groove 25 so as to be secured against torsion.

Figure 11:
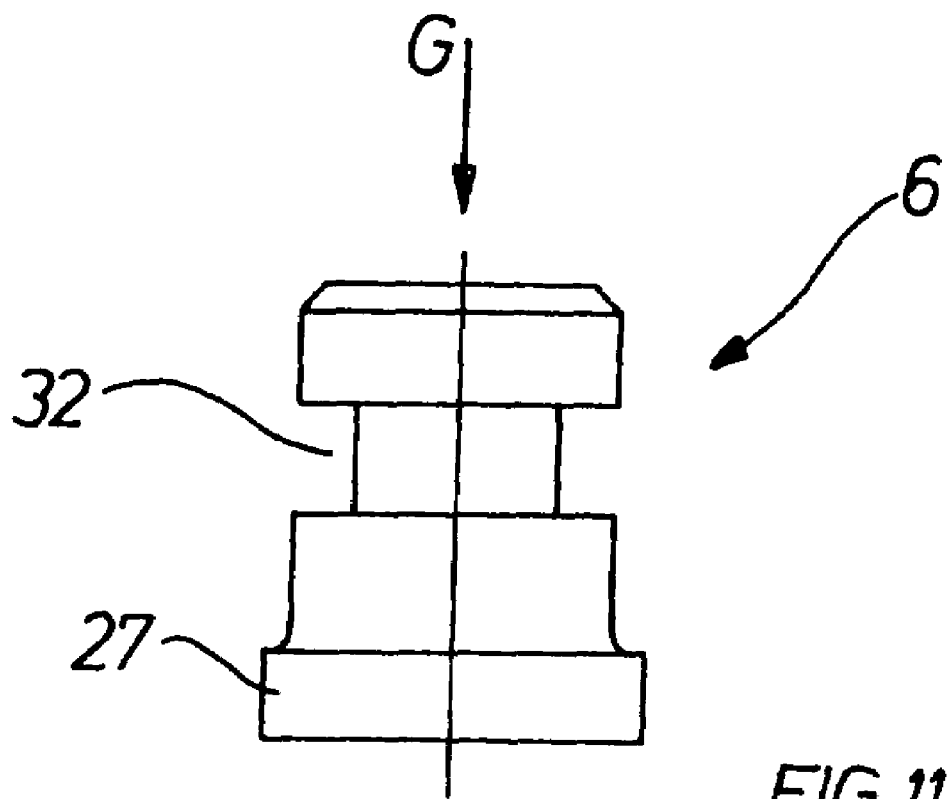
FIG. 11 shows a schematic lateral view of a blind plug.

FIG. 11 shows a schematic lateral view of the blind plug 6. At one end of the blind plug 6 the bearing collar 27 is formed and at a distance from it a groove 32 surrounds the blind plug 6 to receive a sealing element.

Figure 12:
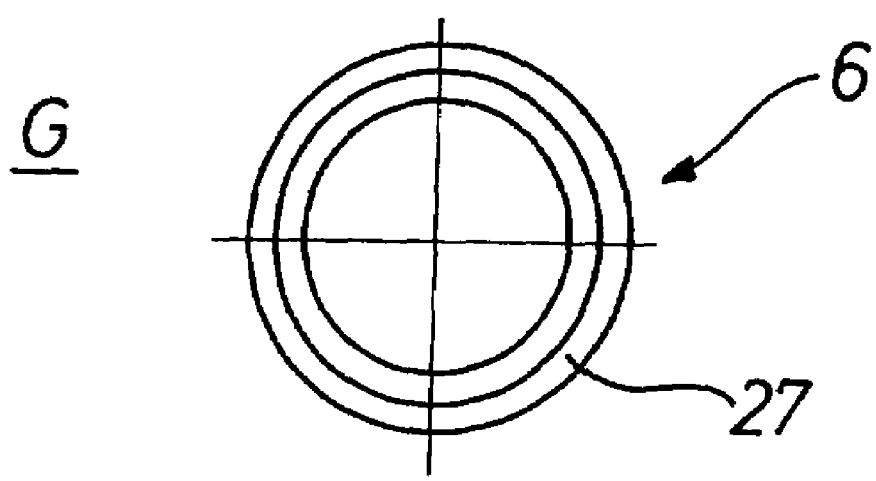
FIG. 12 shows a schematic top view in direction G of FIG. 11 of the blind plug.

FIG. 12 shows a schematic top view of the blind plug 6 as seen in direction G of FIG. 11. The bearing collar for this embodiment of the blind plug 6 is round and here too, as described for the valve seat elements 5, an out of round bearing collar 27 can be provided to prevent torsion of the blind plug 6.

In an embodiment of the stop valve 1 shown in FIG. 1 the valve body element 3 is made with a cross-shaped adapter arrangement, whereby one connection adapter is made without valve seat element receiving bore. At the connection adapter across from this connection adapter the valve seat element receiving bore of the blind plug 6 is inserted and in each of the other two facing connection adapters a valve seat element 5 is inserted. The blind plug 6 as well as the valve seat elements 5 are inserted tightly from the side of the main bolt receiving bore 19 into the radial valve seat element receiving bore 20 and are supported and fixed in radial direction to the outside via the corresponding bearing collar 26 or 27. Because of the out of round design of the bearing collar 26 of the valve seat element 5 the latter is received in the groove 25 in such manner that the valve seat elements 5 are secured against torsion in the valve body element 3. During assembly of the valve body 2 the main bolt 4 is then tightly installed in the bore 19 and is held axially on the valve body element 3 (not shown here) by means of the gripping screw connection.

The connection adapters with valve seat element 5 are thus designed as spindle drive receiving adapters 18 into which a spindle drive 33 with a seat seal 34 that can be adjusted relative to the valve seat 30 of the valve seat elements 5 can be screwed (not shown here). The connection adapter to which the blind plug 6 is assigned and the connection adapter without valve seat element receiving bore 20 are thereby in form of outlet connection adapters 17 into which a demand oxygen system can be screwed (not shown here).

If the main bolt 4 whose axial extension in FIG. 1 is perpendicular to the plane of the drawing is connected by means of the gas tank connection adapter 7 to a pressurized-gas container 35 (not shown here) such as e.g. a compressed air tank for diving application, the gas can follow from the pressurized-gas container 35 through the central gas supply bore 9 into the main bolt 4 and to the radial gas supply bore 11 and through the latter into the gas supply groove 12. The valve seat elements 5 in the assembled state are located with their gas supply bore 29 at the gas supply groove 12 in such manner that the gas is able to flow into the valve seat elements and flows on into the valve seat gas chamber 21 when the spindle drive 33 is open. Valve seat gas chamber 21 the gas is able to flow into the bottom area 21a of the associated outlet connection adapters 17 through the outlet gas line 22 and thereby to the demand oxygen system connected to the outlet connection adapters 17.

Figure 2:
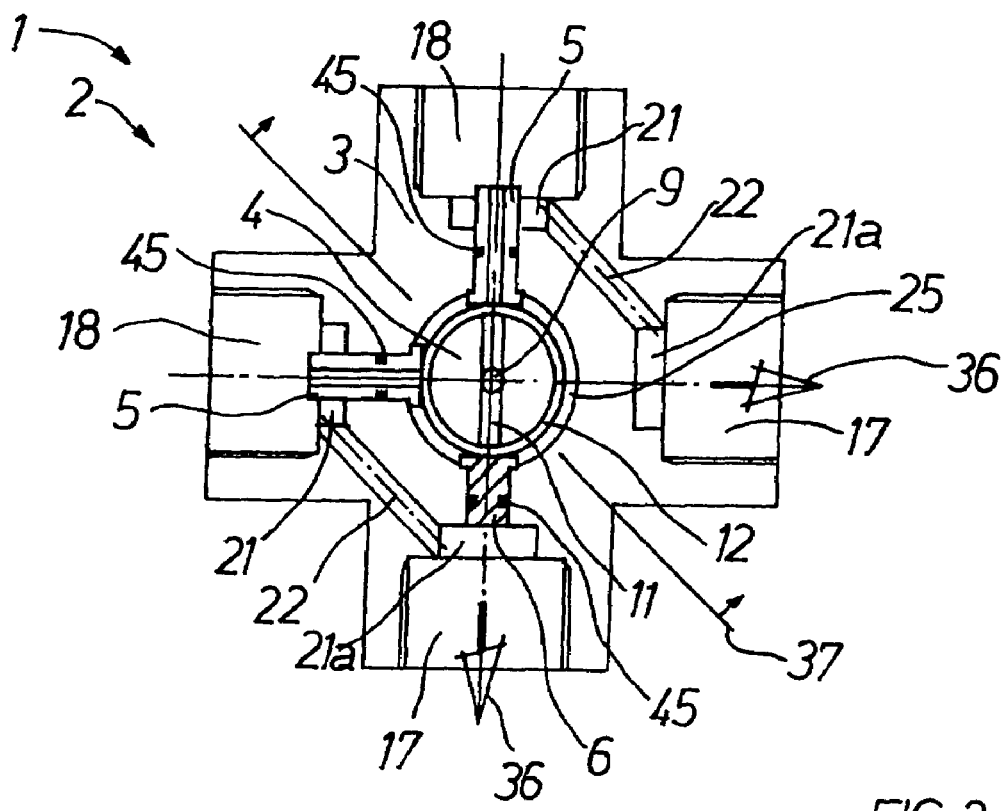
FIG. 2 shows a schematic section of the stop valve of FIG. 1 with a corner valve arrangement.

Based on the placement of the blind plug 6 in FIG. 1, a parallel valve arrangement is formed across from the connection plug without valve seat element receiving bore 20, since the two outlet connection adapters 17 are placed axially across from each other. In FIG. 2 the stop valve 1 is also shown in a schematic sectional view, whereby here, by contrast with the embodiment shown in FIG. 1, the blind plug 6 is next to the connection adapter without valve seat element receiving bore 20. Thus a corner valve arrangement is provided since the two outlet connection adapters 17 are adjoining around the corner. The possible gas output from the outlet connection adapters 17 is shown by arrows 36 in FIGS. 1 and 2.

In addition to the embodiment of the stop valve in form of a double connection valve described in FIGS. 1 and 2, a stop valve can also be made in a simple embodiment in form of a single connection valve. For this one single outlet connection adapter 17 and one single spindle drive receiving adapter 18 suffice, whereby here too the gas is supplied from the pressurized-gas container 35 through the central gas supply bore 9 of the main bolt 4 and the radial gas supply bore 11 into the valve seat elements 5 and from there through the valve seat gas chamber 21 and the outlet gas line 22 to the outlet connection adapter 17. The spindle drive 33 installed in the spindle drive receiving adapter 18 must of course be opened to let gas flow through. A diagonal separation line 37 with suitably placed arrows drawn diagonally into the cross-shaped adapter arrangement of FIG. 2 defines the component area of the stop valve 1 required to create the single-connection valve.

Figure 3:
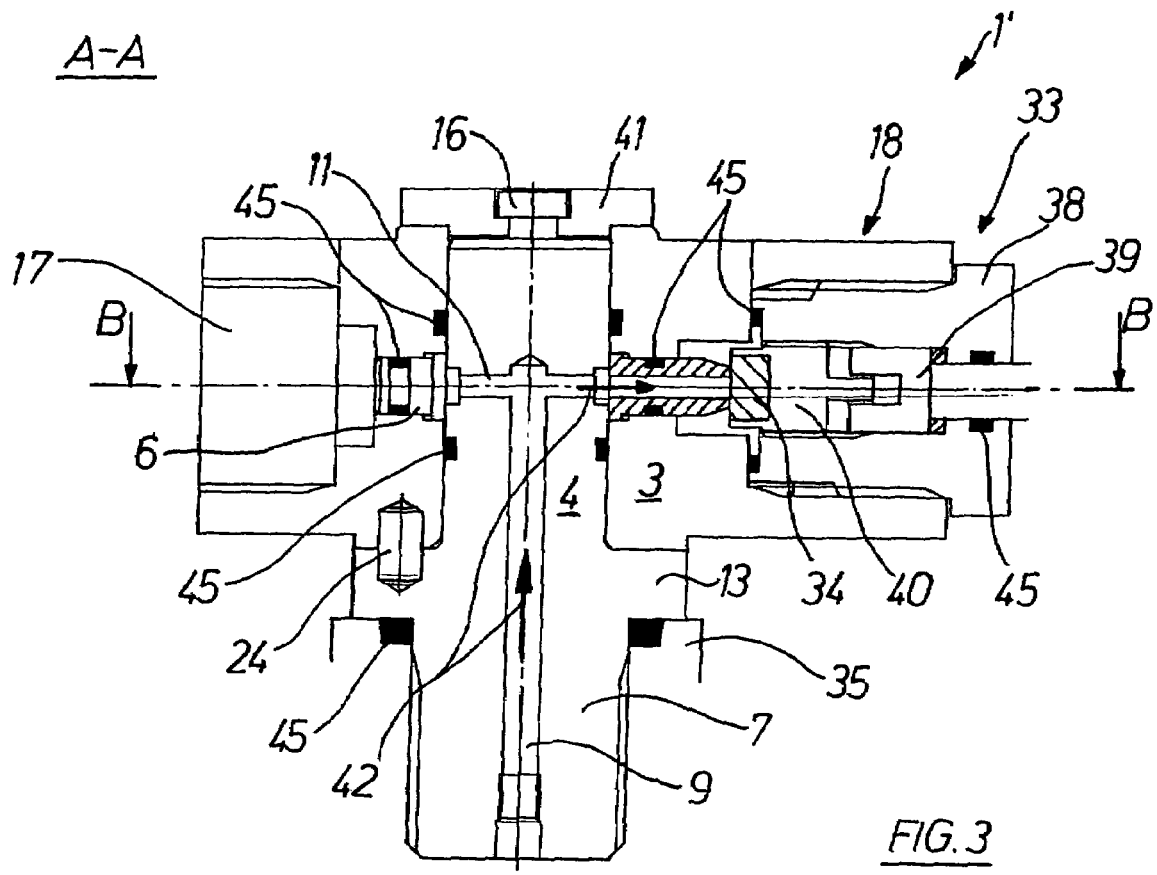
FIG. 3 shows a schematic sectional view through sectional plane A—A of FIG. 4 of a stop valve in a second embodiment.
Figure 4:
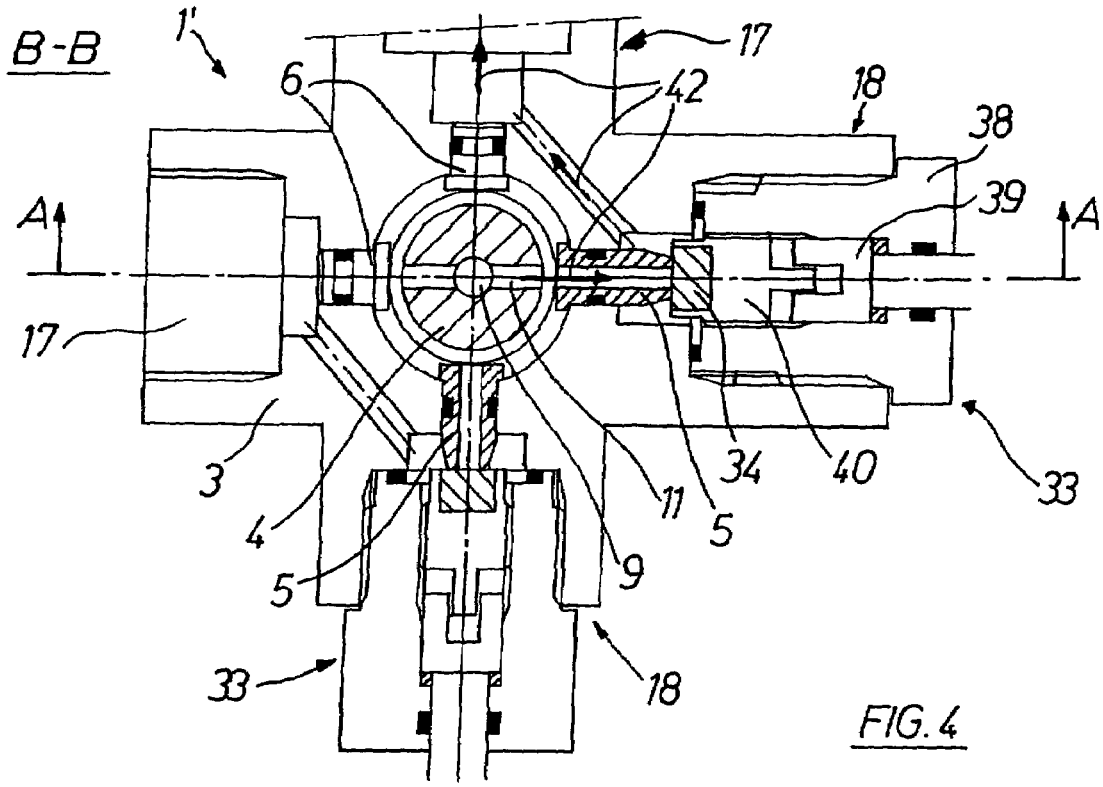
FIG. 4 shows a schematic sectional view through sectional plane B—B of FIG. 3 of the stop valve of FIG. 3.

FIG. 3 shows a schematic sectional view along the sectional plane A—A of FIG. 4 of a stop valve 1' in a second embodiment. Components with the same functions as in the stop valve 1 are given the same reference numbers. As is shown in FIG. 4 in a schematic sectional view along the sectional plane B—B of FIG. 3, each connection adapter is assigned a valve seat element receiving bore 20 in the embodiment of stop valve 1'. The embodiment shown in FIG. 4 is a corner valve arrangement, whereby a spindle drive 33 is screwed into the spindle drive receiving adapter 18. The spindle drive receiving adapters 18 are assigned valve seat elements 5 and the outlet connection adapters 17 are assigned blind plugs 6 in the corresponding valve seat element receiving bores 20.

he spindle drive 33 consists of a screw-in element 38 that can be screwed into the spindle drive receiving adapter 18 from which a rotatable upper spindle 39 protrudes. A lower spindle 40 adjustable relative to the valve seat 30 is coupled to the upper spindle 39, whereby the seat seal 34 is located on the lower spindle 40. The spindle drive 33 is shown in its closed position in FIG. 3 as well as in FIG. 4.

FIG. 3 shows that the pin bore 14 on the main bolt collar 13 and the pin bore 23 on the valve body element 3 are aligned with each other so that the pin 24 can be inserted accordingly as a torsion preventer. The pin 24 can be inserted accordingly as a torsion preventer. The valve body element 3 presses against the main bolt collar 13 in the assembled state. On the axially opposite side of the main bolt collar 13 the pressurized-gas container 35 which is only partially schematically drawn here is located, whereby the gas tank connection adapter 7 with the tank connection threads 8 extends with tight fit into the pressurized-gas container 35. The main bolt 4 is held axially on the valve body element 3, and for this purpose the screw 16 is screwed through a holding disk 41 and into the blind hole 15 of the main bolt 4. The holding disk 41 covers the main bolt receiving bore 19 to ensure functionally secure support relative to the valve body element 3.

The arrows 42 in FIGS. 3 and 4 indicate the gas flow. The gas flows from the pressurized-gas container 35 through the central gas supply bore 9 of the main bolt 4 to the radial gas supply bore 11 of the main bolt 4. From the radial gas supply bore 11 the gas flows on through the gas supply groove 12 into the connection adapters made in form of spindle drive receiving adapters 18 and are equipped accordingly with valve seat elements 5. When the spindle drive 33 s closed, the gas flow is stopped here. When the spindle drive 33 is opened, the gas continues to flow into the valve seat gas chamber 21 and through the outlet gas line 22 into the bottom area 21a of the associated outlet connection adapter 17. A suitable demand oxygen system (not shown) is connected to the latter, so that the gas accordingly flows into it.

Figure 13:
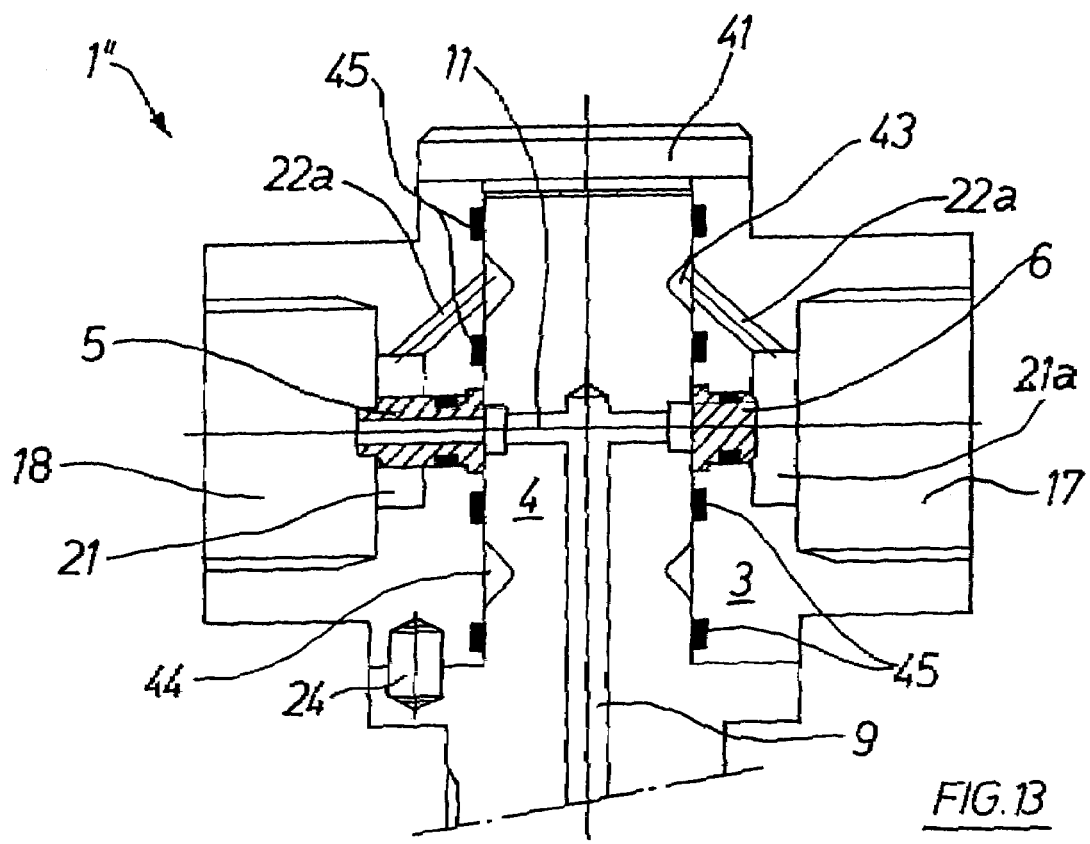
FIG. 13 shows a schematic sectional view through a stop valve in a third embodiment.
Figure 14:
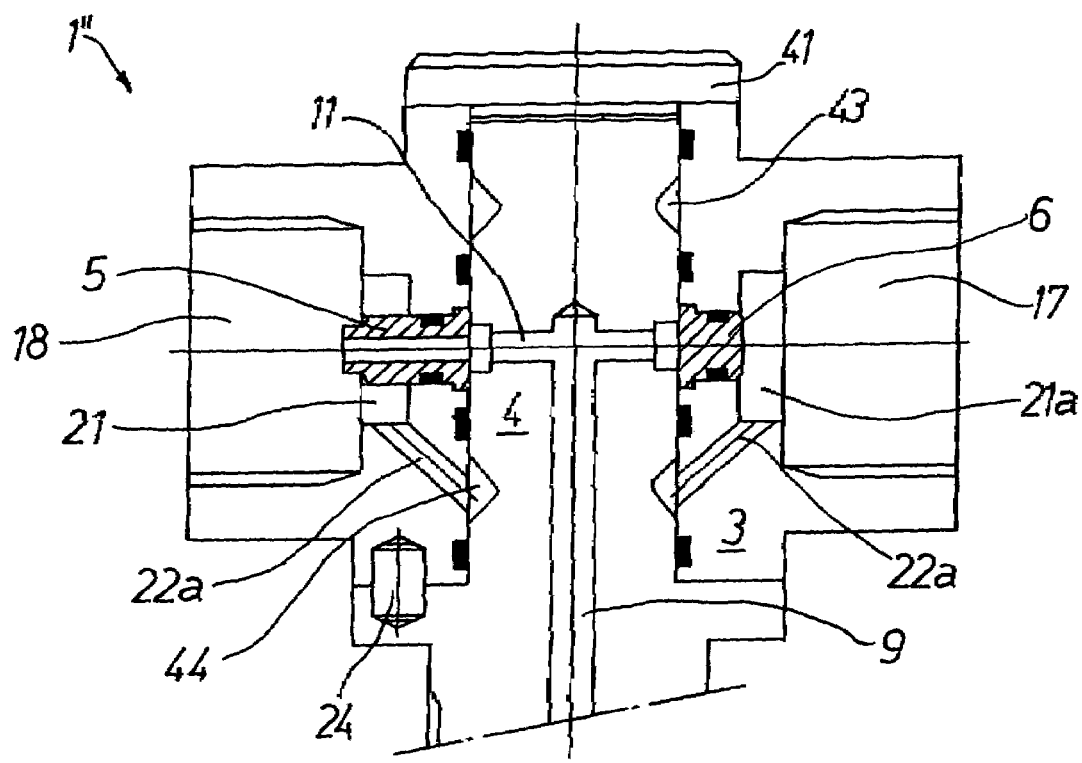
FIG. 14 shows a schematic sectional view through the stop valve of FIG. 13, whereby the sectional planes are rotated by 90° around the longitudinal axis.

In the embodiments of the stop valves 1 and 1' described so far the outlet gas line 22 going from the valve seat gas chamber 21 to the bottom area 21a of the outlet connection adapter 17 is in the form of a straight and direct gas outlet bore in the valve body element 3. In a third embodiment of a stop valve 1" shown in FIGS. 13 and 14 the outlet gas line 22a comes from the valve seat gas chamber 21 and goes through a gas outlet groove 43 surrounding the main bolt 4. From there the outlet gas line 22a continues on the circumference of the main bolt 4 and offset relative to the bottom area 21a of the associated outlet connection adapter 17. The stop valve 1" is shown in FIG. 13 in a schematic sectional view in axial direction of the main bolt 4, whereby FIG. 14 shows a sectional view through the stop valve 1" that is rotated by 90° around the longitudinal axis of the main bolt 4 from the position shown in FIG. 13. As can be seen from the arrangement of the valve seat elements 5 and of the blind plugs 6, the valve body element 3 is designed on the one hand with four valve seat element receiving bores 20, and on the other hand the stop valve 1" is made in form of a corner valve arrangement. Components with the same function as for stop valve 1 or 1' are given the same reference numbers. In the shown embodiment in form of a double connection valve, a second gas outlet groove 44 is provided and is offset relative to the gas outlet groove 43 in order to connect the two outlet connection adapters 17 and the second assigned spindle drive receiving adapter 18 (see FIG. 14) for gas flow. To further secure against torsion between the valve body element 3 and the main bolt 4, two pins 24 with corresponding pin bores 14 and 23 are provided here.

In all the embodiments of the stop valve 1, 1' and 1" the components are designed so that tight fit is ensured in the assembled state. Appropriate sealing elements are provided in particular between the main bolt 4 and the valve body element 3 and between valve seat element 5 or blind plug 6 and valve seat element receiving bore 20. The spindle drive 33 is also suitably sealed on the one hand against the spindle drive receiving adapter 18 and on the other hand between upper spindle 39 and screw-in element 38. All the sealing elements shown in the figures, with the exception of the seat seal 34 of the 33 are given the reference number 45.

n general the stop valve 1, 1' or 1" according to the invention makes it possible to provide simple and economic adaptation to different circumstances. The design of the stop valve 1, 1' or 1" according to the modular principle, with the components valve body element 3, main bolt 4, valve seat element 5 and blind plug 6 allows for great variability. Thereby the main bolt 4 or the gas tank connection adapter 7 of the main bolt 4 can easily be provided in suitably different embodiments for different pressurized-gas containers 35 on the market. The connection adapters of the valve body element 3 can also be made in different types of embodiments corresponding to the demand oxygen systems existing on the market. Thanks to the possibility of simply providing variations of the valve seat elements 5 or of the blind plugs 6 it is possible to provide a parallel valve arrangement or a corner valve arrangement, e.g. in accordance with the customer's wishes. The listing of possible variations of the stop valve 1, 1' or 1" is here only given as example, since the total number of theoretically possible variations is much higher.

What is claimed is:

1. In a stop valve for a portable pressurized-gas container, comprising:
   a valve body having at least three connection adapters;
   a central connection adapter for a gas tank connection having tank connection threads;
   at least two additional connection adapters which are axially offset to serve as outlet connection adapters;
   spindle drive receiving adapters located in a transversal plane radial to the axis of the gas container connection adapter;
   at least one central gas line bore starting at the gas container connection adapter, leading into the transversal area followed by a radial gas supply bore going to the bottom area of the spindle drive receiving adapter with a valve seat having a valve seat gas chamber surrounding it being formed in the bottom area;
   a hand-operated spindle drive with seat seal being adjustable relative to the valve seat tightly inserted in the spindle drive receiving adapter and held there by screw connection; and,
   an outlet gas line going from the valve seat gas chamber to the bottom area of the outlet connection adapter, the improvement wherein the valve body (2) is made in multiple parts and comprises:
   a) a valve body element (3) having an outlet connection adapter (17), a spindle drive receiving adapter (18), a central main bolt receiving bore (19), and a radial valve seat element receiving bore (20) going to the bottom of the spindle drive receiving adapter (18),
   b) an oblong valve seat elements (5) with a gas supply bore (29), having at one end a valve seat (30) and at the other end a bearing collar (26) whereby the valve seat element (5), starting at the main bolt receiving bore (19) is tightly inserted, supported, and fixed in radial direction to the outside by the bearing collar (26),
   c) a main bolt (4) inserted tightly into the central main bolt receiving bore (19), with the central gas supply bore (9), on one end of which the gas tank connection adapter (7) having container connection threads (8) protruding from the valve body element (3) is formed and followed by a main bolt collar (13), whereby the latter serves to support valve body element (3) on the one hand and receives support from gas container connection edge (36) on the other hand;
   d) a gripping screw connection being provided for axial holding of the main bolt (4) in the main bolt receiving bore (19), and,
   e) a segment of the radial gas supply bore (11) going to the valve seat element (5) being found in the main bolt (4).

2. The stop valve of claim 1, wherein the stop valve (1, 1' or 1") is a double connection valve with two outlet connection adapters (17) and two spindle drive receiving adapters (18) assigned to either, each with a valve seat element (5) and one single central main bolt (4).

3. The stop valve of claim 2, wherein at least one radial gas supply bore (11) goes through the main bolt (4) and into the gas supply groove (12) surrounding it to which the gas supply bore (29) of the two valve seat elements (5) offset relative to each other is connected.

4. The stop valve of claim 2, wherein the outlet connection adapters (17) and the assigned main bolt receiving bores (19) are offset by 90° resulting in a cross-shaped adapter arrangement.

5. The stop valve of claim 4, wherein three valve seat element receiving bores (20) are provided in the valve body element (3) between the main bolt receiving bore (19) and at least three connection adapter bottoms, into each of which a blind plug (6) for the formation of an outlet connection adapter (17) and a valve seat element (5) for the formation of an associated spindle drive receiving adapter (18) is tightly inserted.

6. The stop valve of claim 1, wherein at least one outlet connection adapter (17) and an associated spindle drive receiving adapter (18) are provided with identical internal threads.

7. The stop valve of claim 1, wherein on the contact surfaces of the valve body element (3) and the main bolt collar (13) associated and aligned pin bores (14, 23) with an inserted pin (24) are provided as torsion prevention.

8. The stop valve of claim 1, wherein the bearing collar (2) of the valve seat elements (5) and if necessary a bearing collar 27 of a blind plug (6) is made out of round, preferably square, and is held with torsion prevention in a groove (25) in the wall of the main bolt receiving bore (19).

9. The stop valve of claim 1, wherein that the gripping screw connection of the main bolt (4) is constituted by a holding disk (41) covering the main bolt receiving bore (19) and a central screw (16) connecting the holding disk (41) to the face of the main bolt (4).

10. The stop valve of claim 1, wherein the outlet gas line (22) extends from a valve seat gas chamber (21) to the bottom area of a outlet connection adapter (17) in form of a straight, direct outlet gas bore in the valve body element (3).

11. The stop valve of the claim 1, wherein the gas outlet line (22a) extends from the valve seat gas chamber (21) into a surrounding gas outlet guiding groove 43 and from there along the circumference of the gas outlet guiding groove offset relative to the bottom area (21a) of the associated outlet connection adapter (17), whereby two gas outlet guiding grooves (43; 44) offset relative to each other are provided in case of a double connection valve.

12. The stop valve of claim 1, in a screw connection element (38) that can be screwed into the spindle drive receiving adapter 18 the spindle drive (33) has an upper spindle (39) protruding out of the screw connection element (38) and a lower spindle (40) with the seat seal (34) coupled to it and adjustable relative to the valve seat (30).

* * * * *